Aug. 17, 1965         A. G. NELSON         3,200,913
FRAME CORNER FASTENER ASSEMBLY
Filed June 14, 1962
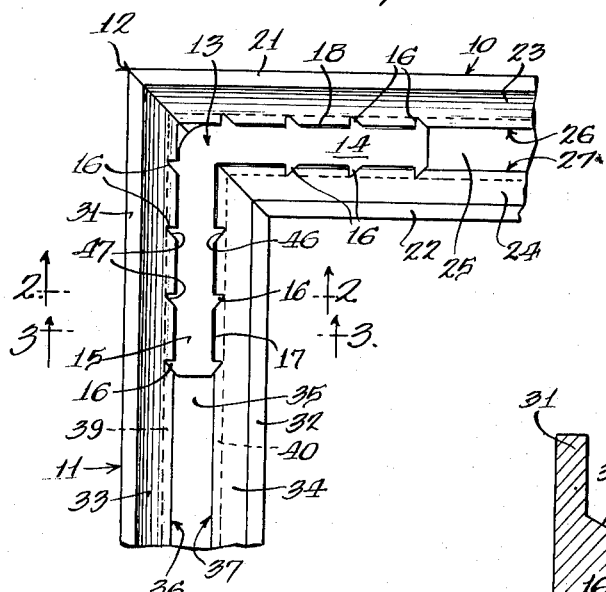
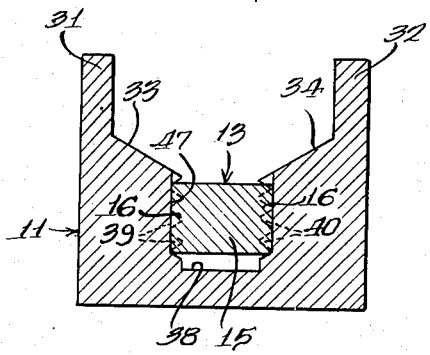
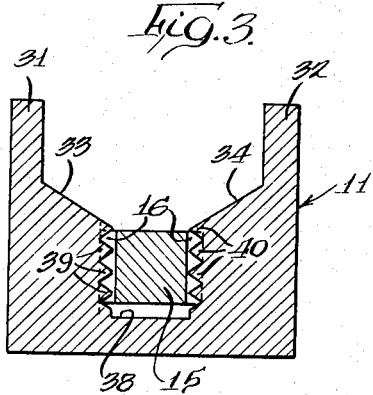
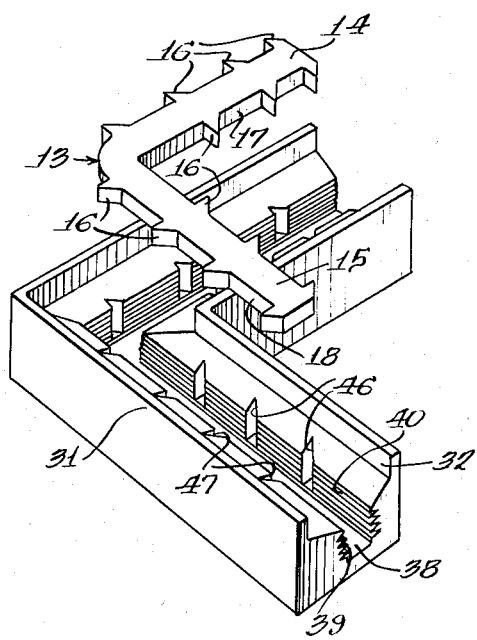
INVENTOR.
Averd G. Nelson
BY Hofgren, Brady, Wegner,
Allen + Stellman
attys

3,200,913
FRAME CORNER FASTENER ASSEMBLY
Averd G. Nelson, Wisconsin Rapids, Wis., assignor to Preway Inc., a corporation of Wisconsin
Filed June 14, 1962, Ser. No. 202,576
2 Claims. (Cl. 189—36)

This invention relates to lengths of rigid members which are joinable. This invention especially relates to framing and the construction of frames formed of rigid materials. The invention further relates to the construction of frames for pictures, bulletin boards, windows and the like, as well as for ovens, cooking surfaces, dish washers and the like, whether as purely aesthetic framing or as structurally functional framing.

In the construction of frames, especially frames made from pliable materials, e.g. aluminum, it has become a common practice to construct frames from frame members by using splines or like connections. Such construction methods often entail the forcing or force-fitting of a spline or other joining member into the frame member at junctures of framing members. Such forcing can produce bulging or other distortion on the exterior of the frame member adjacent the juncture. The bulges or other distortions may be sufficiently unsightly to render the frame structure useless for many purposes, especially where the joint remains uncovered showing an unsightly juncture.

It is a general object of this invention to provide new and improved frame members and frame structures.

A more particular object of this invention is to provide a rigid frame member which is capable of joining to another rigid frame member without appreciable distortion or bulging.

It is another object of this invention to provide a rigid frame member having a channel in which there are provided a plurality of lengthwise corrugations, which corrugations permit assembly of a frame structure without appreciable distortion of the frame members.

Another object is to provide a framing construction made up of said frame members.

A still further object is to provide a rigid aluminum frame member with a channel and a plurality of corrugations in the aluminum lengthwise within the channel on the sides of the channel, which corrugations in effect absorb the distorting forces of assembly of frame construction using the frame member.

It is another object to provide a frame construction which is made up of channeled frame members having corrugations on the sides of the channels and a toothed joining member which is force-fitted within channels of two frame members at the junction thereof with the teeth of the joining member forced transversely through and broaching the corrugation so that the grooves of the corrugations adjacent the position of broaching receive the material broached from the corrugations to prevent distortion of the outer surfaces of said frame members.

Additional objects, as well as other features and embodiments of this invention, will be apparent to those in the art from the following descriptions and from the drawings in which:

FIGURE 1 shows an embodiment of a frame construction in a view looking into the channels of joined frame members;

FIGURE 2 is a cross section through the embodiment of FIGURE 1 along line 2—2;

FIGURE 3 is a cross section through the embodiment of FIGURE 1 along line 3—3;

FIGURE 4 is a disassembled perspective view of the embodiment of FIGURE 1, showing the frame members and their juncture by the connector element.

While this invention is susceptible of embodiments in many different forms, there is shown in the drawing, and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

As shown in the drawings with reference to FIGURES 1 through 4 there is provided a frame structure composed of frame members 10 and 11 and connector member 13. Aluminum frame members 10 and 11 are of the same configuration and abut at mitered ends, shown at reference numeral 12, where they are joined together by aluminum connector 13.

The frame members 10 and 11 are provided with projecting flanges 21, 22, 31 and 32 and sloping surfaces 23, 24, 33 and 34 which slope from the inner bases of the projecting flanges to channels 25 and 35 in frame members 10 and 11 respectively. Channels 25 and 35 have channel side walls 26 and 27 and channel side walls 36 and 37 respectively. The channel side walls 26, 27, 36 and 37 each have lengthwise corrugations in the aluminum material of which the frame members are composed. For example, corrugations on side walls 36 and 37 of channel 35 are shown at 39 and 40 respectively. Each channel, of course, has a bottom defining its lower limit and joining the channel side walls; such a bottom for channel 35 is shown at 38.

The angular connector member 13 joins frame members 10 and 11 at juncture 12 by interlocking of the connector member with the corrugations within the channels. The illustrated connector member is a right angle connector and is shown as a flat elongated angular form having legs 14 and 15. Connector 13 is provided with gripping teeth 16 which act as broaching or shearing teeth in the assembly of the frame structure or joint as will be more apparent hereinbelow. The connector member can, of course, be of any configuration which conforms with a configuration of the channels in the framing members at the intercommunication of the channels where the frame members are joined, e.g., by abutting. The frame members 10 and 11 are provided with mitered ends to form the intercommunication of channels with which the configuration of connector member 13 conforms. The teeth 16 are preferably triangular in form as illustrated, with a less acute angle, e.g. a right angle, to the edge of connector member 17 provided on the leading edges of the teeth, i.e. the edges facing the joint. The edges of connector member 13 are showing at 17 and 18.

FIGURE 4 shows disconfiguration at reference numeral 46 in the aluminum corrugations. Such disconfiguration results from assembly of the connector member with the frame members. Accordingly, in assembling the frame structure, frame members 10 and 11 are abutted at flat mitered ends to form a right angle and the right angular member 13 is placed over the channels in position to be forced into the channels. A force is then applied upon connector member 13, e.g. by pressing, and connector member 13 is thereby urged into channels 25 and 35, shearing or broaching the corrugations on the side walls transversely until the connector member comes to rest in the position shown in FIGURE 1. The shearing or broaching action transverse to the corrugations creates the disconfigurations or gouges shown as transverse grooves 46 and 47. The metal sheared or otherwise deformed from the corrugations is received by the corrugations between ridges of the corrugations adjacent the position of broaching to form the transverse grooves 46 and 47, preventing exterior bulging of frame members 10 and 11. Upon assembly, the frame members are thereby secured against separation at their abutment.

Preferably the assembly entails the broaching of the corrugations by the connector element teeth in a direction perpendicular to the corrugations so that the frame members are not shifted with respect to each other during assembly. Thus, the preferred connector member is one having teeth with cutting surfaces or edges perpendicular across the connector element and capable of providing a cutting direction perpendicular to the corrugations.

Frame members have been assembled in accordance with the present invention and have been examined for exterior bulging. No such bulging was found. Although I do not wish to be held to any theories with respect to my present invention, it is believed that the forces normally causing bulging in an assembly of channeled frame members are taken up or absorbed by the broaching of corrugations by the connector member teeth. The corrugations are of sufficient depth to permit their disconfiguration without transferring sufficient force for distortion or disconfiguration of the exterior of the frame member.

It is apparent from the foregoing that I have provided a new channeled frame member having configurations which permit assembly of framing construction without undue bulging or other deforming or distortion of the exterior surfaces adjacent the joint. The corrugations within the channels of my new and useful frame member are transversely broachable by the teeth of the connector member.

I claim:

1. A framing construction comprising a pair of channel shaped frame members each having opposing side faces within the channel, a series of generally parallel, longitudinally extending, corrugations including hills and vales on said opposing side faces within the channel, an elongated connector member having longitudinally spaced, transversely disposed rigid teeth projecting outwardly from opposite side faces of said connector member, said connector member being positioned in the pair of channel members with the channel members abutting at ends with the connector member lapping both channel members and the teeth held in broached recesses traversing the corrugations on said opposing sides of both channel members, said vales being of a size sufficient for accommodation of material broached from the hills of the corrugations, thereby eliminating appreciable deformation of the exterior surface of the channel members.

2. A framing construction comprising a channel shaped frame member having opposing side faces within the channel, a series of generally parallel, longitudinally extending, corrugations including hills and vales on said opposing side faces within the channel, an elongated connector member having longitudinally spaced, transversely disposed rigid teeth projecting outwardly from opposite side faces of said connector member, said connector member being positioned in the channel member at an end of the channel member, with the teeth of the connector member held in broached recesses traversing the corrugations on said opposing sides of the channel member, said vales being of a size sufficient for accommodation of material broached from the hills of the corrugations, thereby eliminating appreciable deformation of the exterior surface of the channel member.

References Cited by the Examiner

UNITED STATES PATENTS

| 2,101,349 | 12/37 | Sharp | 189—36 |
| 2,857,635 | 10/58 | Malpe et al. | 20—92 |
| 3,083,797 | 4/63 | Wergin | 189—36 |

RICHARD W. COOKE, Jr., *Primary Examiner.*

JACOB L. NACKENOFF, *Examiner.*